United States Patent
Tseng

(10) Patent No.: US 10,979,657 B2
(45) Date of Patent: Apr. 13, 2021

(54) IMAGE SENSOR CIRCUIT WITH REDUCED NOISE INTERFERENCE AND CONTROL METHOD THEREOF

(71) Applicant: SHENZHEN GOODIX TECHNOLOGY CO., LTD., Guangdong (CN)

(72) Inventor: Chien-Jian Tseng, Guangdong (CN)

(73) Assignee: SHENZHEN GOODIX TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 16/657,632

(22) Filed: Oct. 18, 2019

(65) Prior Publication Data
US 2020/0053300 A1    Feb. 13, 2020

Related U.S. Application Data

(63) Continuation of application No. PCT/CN2018/082949, filed on Apr. 13, 2018.

(51) Int. Cl.
*H04N 5/357* (2011.01)

(52) U.S. Cl.
CPC .................. *H04N 5/357* (2013.01)

(58) Field of Classification Search
CPC ...... H04N 5/357; H04N 5/378; H04N 5/3745; H04N 5/3575; H04N 5/3658; H04N 5/3577; H04N 5/369
See application file for complete search history.

(56) References Cited

U.S. PATENT DOCUMENTS 8,284,277 B2 * 10/2012 Nikai .................. H04N 5/335
                                                            348/245
9,148,605 B1    9/2015 Wang
(Continued)

FOREIGN PATENT DOCUMENTS

CN    1951104 A    4/2007
CN    1980335 A    6/2007
(Continued)

OTHER PUBLICATIONS

English Abstract Translation of Foreign Reference CN1951104A.
(Continued)

*Primary Examiner* — Twyler L Haskins
*Assistant Examiner* — Angel L Garces-Rivera
(74) *Attorney, Agent, or Firm* — WPAT, P.C., Intellectual Property Attorneys; Anthony King

(57) ABSTRACT

An image sensor circuit is provided. The image sensor circuit includes a pixel array and a processing circuit. The pixel array includes a pixel. The pixel includes a photoelectric conversion unit, a first processing unit and a second processing unit. The photoelectric conversion unit is configured to convert a light signal into an electrical signal. The first processing unit, coupled to the photoelectric conversion unit, is configured to receive the electrical signal and generate a pixel output. The second processing unit is configured to receive a reference signal and generate a reference output. The reference output carries noise interference information. The processing circuit, coupled to the pixel, is configured to generate a sensor output according to the pixel output and the reference output. A control method of an image sensor circuit is also provided.

20 Claims, 10 Drawing Sheets

(56) References Cited

U.S. PATENT DOCUMENTS

2005/0082461 A1   4/2005   Bock
2007/0132868 A1   6/2007   Lee et al.
2015/0181140 A1   6/2015   Onishi et al.

FOREIGN PATENT DOCUMENTS

| CN | 101753860 A | 6/2010 |
| CN | 102859996 A | 1/2013 |
| CN | 104125421 A | 10/2014 |
| WO | WO2005117418 A1 | 12/2005 |
| WO | WO2009011465 A1 | 1/2009 |

OTHER PUBLICATIONS

English Abstract Translation of Foreign Reference CN1980335A.
English Abstract Translation of Foreign Reference CN104125421A.
ISA 220 form.
International Search Report in Chinese for (Form PCT/ISA/210).
ISA 237 form.
English Abstract Translation of Foreign Reference CN 102859996.
English Abstract Translation of Foreign Reference CN 101753860.

\* cited by examiner

IMAGE SENSOR CIRCUIT WITH REDUCED NOISE INTERFERENCE AND CONTROL METHOD THEREOF

CROSS-REFERENCE TO RELATED APPLICATIONS

The present application is a continuation of international application No. PCT/CN2018/082949, filed on Apr. 13, 2018, of which is incorporated herein by reference in its entirety.

TECHNICAL FIELD

The present disclosure relates to image sensing and, more particularly, to an image sensor circuit capable of reducing row noise interference and a related control method of an image sensor.

BACKGROUND

An existing image sensor utilizes active noise cancellation (ANC) to reduce row noise interference in a pixel array to thereby enhance image quality. However, active noise cancellation requires numerous dummy pixels to achieve good noise reduction performance, which causes a decrease in a ratio of the number of effective pixels to the number of total pixels in a pixel array. Additionally, active noise cancellation has to perform complicated digital signal processing to subtract an output of a dummy pixel from an output of an active pixel, thus resulting in an increase in system power consumption. Furthermore, owing to process variations, active noise cancellation fails to refer to individual noise occurring in each active pixel to perform noise reduction. Active noise cancellation merely subtracts average noise of a row of dummy pixels from an output of the active pixel.

Therefore, there is a need for a novel image sensing scheme, which has a large ratio of the number of effective pixels to the number of total pixels and reduced computational complexity, and is capable of referring to individual noise occurring in each active pixel to perform noise reduction.

SUMMARY

It is an objective of the present disclosure to provide an image sensor circuit capable of reducing row noise interference and a related control method of an image sensor to solve the abovementioned problems.

Some embodiments of the present disclosure comprise an exemplary image sensor circuit. The image sensor circuit comprises a pixel array and a processing circuit. The pixel array comprises a pixel, which comprises a photoelectric conversion unit, a first processing unit and a first processing unit. The photoelectric conversion unit is configured to convert a light signal into an electrical signal. The first processing unit, coupled to the photoelectric conversion unit, is configured to receive the electrical signal and generate a pixel output. The second processing unit is configured to receive a reference signal and generate a reference output, wherein the reference output carries noise interference information. The processing circuit, coupled to the pixel, is configured to generate a sensor output according to the pixel output and the reference output.

Some embodiments of the present disclosure comprise an exemplary image sensor circuit. The image sensor circuit comprises a pixel array and a processing circuit. The pixel array has a plurality pixels arranged in rows and columns. The pixels comprise a first pixel and a second pixel. The first pixel comprises a first photoelectric conversion unit, a first processing unit and a second processing unit. The first photoelectric conversion unit is configured to convert a light signal into a first electrical signal. The first processing unit, coupled to the first photoelectric conversion unit, is configured to receive the first electrical signal and generate a first pixel output. The second processing unit is configured to receive a reference signal and generate a first reference output, wherein the first reference output carries noise interference information. The second pixel and the first pixel are disposed in adjacent rows or adjacent columns. The second pixel comprises a second photoelectric conversion unit, configured to convert the light signal into a second electrical signal. The second pixel and the first pixel share at least a portion of the first processing unit and at least a portion of the second processing unit such that the second pixel is configured to generate a second pixel output and a second reference output. The processing circuit, coupled to the pixels, is configured to generate a first sensor output according to the first pixel output and the first reference output, and generate a second sensor output according to the second pixel output and the second reference output.

Some embodiments of the present disclosure comprise an exemplary control method of an image sensor circuit. The control method comprises the following steps: before a floating diffusion node receives an electrical signal, resetting the floating diffusion node, and concurrently resetting a reference node; amplifying a pixel signal at the floating diffusion node to generate a pixel output; amplifying a reference signal at the reference node to generate a reference output; and generating, by a processing circuit, a sensor output according to the pixel output and the reference output.

DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to". Also, the term "couple" and "coupled" are intended to mean either an indirect or direct electrical connection. Accordingly, if a first device is coupled to a second device, that connection may be through a direct electrical connection, or through an indirect electrical connection via other devices and connections.

Figure 1:
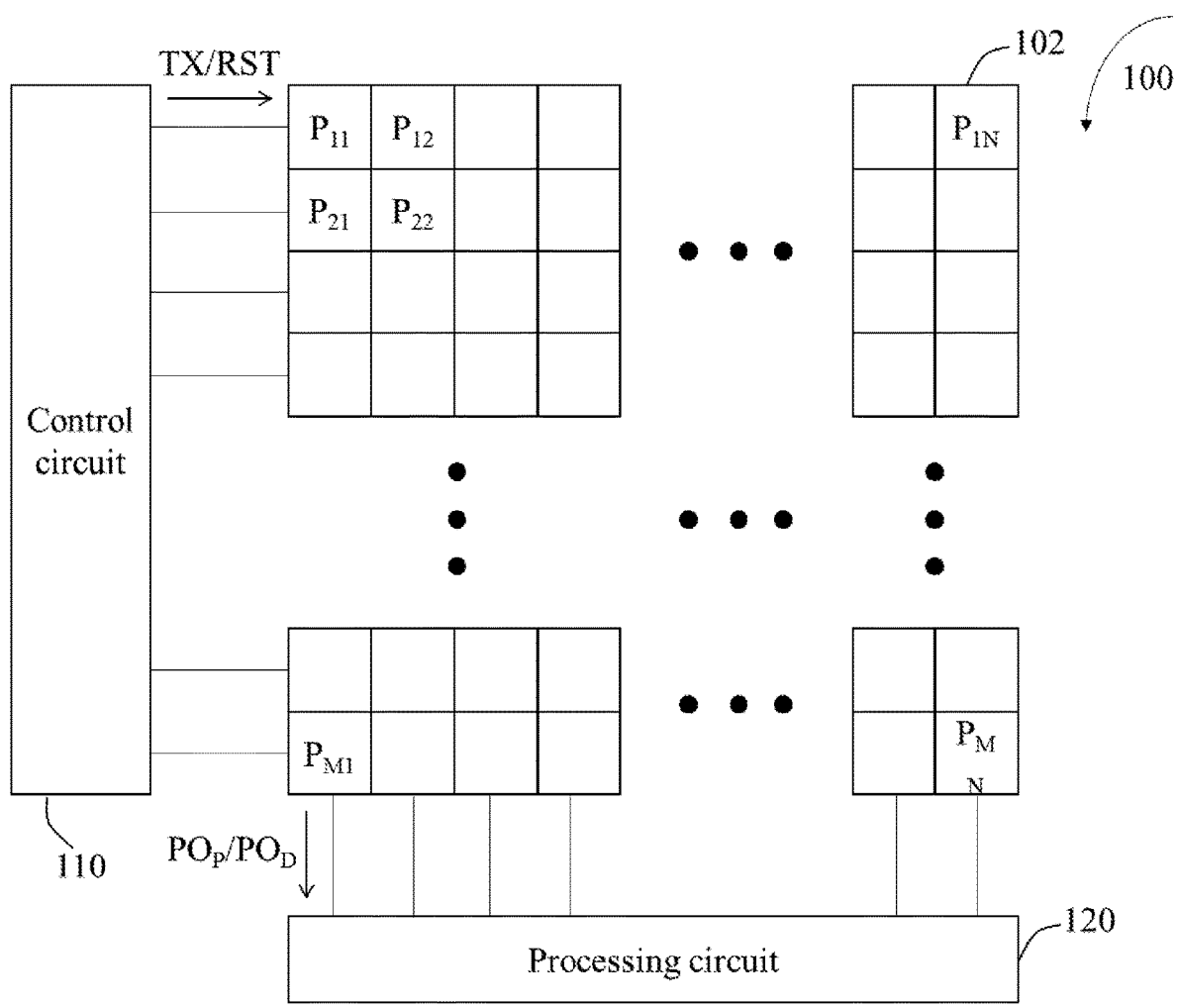
FIG. 1 is a block diagram illustrating an exemplary image sensor circuit in accordance with some embodiments of the present disclosure.

FIG. 1 is a block diagram illustrating an exemplary image sensor circuit in accordance with some embodiments of the present disclosure. The image sensor circuit 100 may include, but is not limited to, a pixel array 102, a control circuit 110 and a processing circuit 120. The pixel array 102 includes a plurality of pixels $P_{11}$-$P_{MN}$, also referred to as pixel units or pixel circuits, arranged in M rows and N columns, where each of M and N is a positive integer greater than one. The control circuit 110, coupled to the pixel array 102, is configured to control sensing operations associated with each pixel, thereby generating a pixel output carrying photoelectric conversion information and a reference output carrying noise interference information. The pixel output and the reference output may be generated simultaneously. The noise interference information carried by the reference output may be a replica of noise interference with the pixel output. Next, the processing circuit 120, coupled to the pixels $P_{11}$-$P_{MN}$, may generate a sensor output according to outputs generated from each pixel, such as pixel outputs carrying photoelectric conversion information and reference outputs carrying noise interference information.

Figure 2:
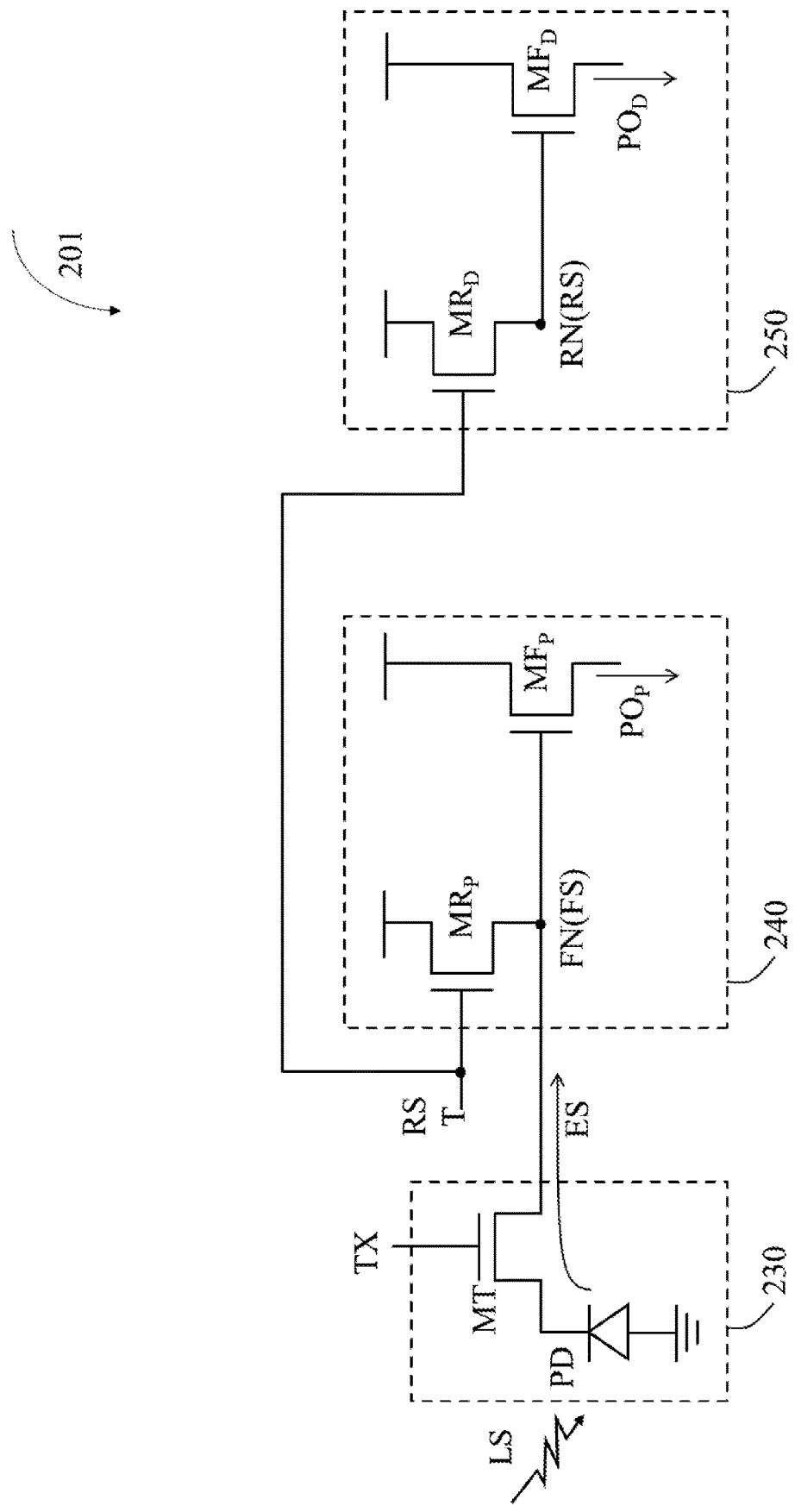
FIG. 2 illustrates an implementation of at least one of the pixels shown in FIG. 1 in accordance with some embodiments of the present disclosure.

Referring to FIG. 2 and also to FIG. 1, an implementation of at least one of the pixels $P_{11}$-$P_{MN}$ shown in FIG. 1 is illustrated in accordance with some embodiments of the present disclosure. In the present embodiment, the pixel 201 may include a photoelectric conversion unit 230, a first processing unit 240 and a second processing unit 250. The first processing unit 240 has a circuit structure similar/identical to that of the second processing unit 250. The main difference is that the first processing unit 240 can be directly connected to the photoelectric conversion unit 230 while the second processing unit 250 is disconnected from the photoelectric conversion unit 230.

The photoelectric conversion unit 230 is configured to convert a light signal LS into an electrical signal ES, such as photoelectric current or charges. The photoelectric conversion unit 230 includes, but is not limited to, a photodiode PD and a transfer transistor MT. The photodiode PD is configured to sense the light signal LS to generate the electrical signal ES. The transfer transistor MT, coupled to the photodiode PD, is configured to selectively transfer the electrical signal ES from the photoelectric conversion unit 230 to the first processing unit 240. In the present embodiment, the transfer transistor MT can be controlled by a transfer signal TX generated from the control circuit 110.

The first processing unit 240 includes a floating diffusion node FN, a first reset transistor $MR_P$ and a first amplifier transistor $MR_P$. The floating diffusion node FN is coupled to the photoelectric conversion unit 230, e.g. the transfer transistor MT of the photoelectric conversion unit 230, and is configured to receive the electrical signal ES. The first reset transistor $MR_P$, coupled to the floating diffusion node FN, is configured to selectively reset the floating diffusion node FN according to a reset signal RST generated from the control circuit 110. For example, before the floating diffusion node FN receives the electrical signal ES, the first reset transistor. $MR_P$ can reset the floating diffusion node FN. After the floating diffusion node FN is reset, the floating diffusion node FN can receive the electrical signal ES. As a result, charges generated by photoelectric conversion can be accumulated at the floating diffusion node FN, thereby generating a pixel signal FS, e.g. a voltage signal or a charge accumulation result, at the floating diffusion node FN. Additionally, the first amplifier transistor $MF_P$, coupled to the floating diffusion node FN, is configured to amplify the pixel signal FS at the floating diffusion node FN to generate a pixel output $PO_P$. In the present embodiment, the first amplifier transistor $MF_P$ can be implemented by a source follower. However, this is not intended to limit the present disclosure.

The second processing unit 250 includes a reference node RN, a second reset transistor $MR_D$ and a second amplifier transistor $MF_D$. The reference node RN is uncoupled from the photoelectric conversion unit 230. For example, the reference node RN can be electrically isolated from the photoelectric conversion unit 230. As a result, the reference node RN would not receive the electrical signal ES transferred from the transfer transistor MT. The second reset transistor $MR_D$ is coupled to the reference node RN, and is configured to, when the first reset transistor $MR_P$ resets the floating diffusion node FN, reset the reference node RN which is uncoupled from the photoelectric conversion unit 230. For example, the first reset transistor $MR_P$ and the second reset transistor $MR_D$ can be commonly controlled by the reset signal RST. When the first reset transistor $MR_P$ reset the floating diffusion node FN coupled to the photoelectric conversion unit 230, the second reset transistor $MR_D$ can simultaneously or synchronously reset the reference node RN uncoupled from the photoelectric conversion unit 230. In addition, the second amplifier transistor $MF_D$, coupled to the reference node RN, is configured to amplify a reference signal RS at the reference node RN to generate a reference output $PO_D$. In the present embodiment, the implementation of the second amplifier transistor $MF_D$ in the second processing unit 250 can be similar/identical to that of the first amplifier transistor $MF_P$ in the first processing unit 240. For example, the second amplifier transistor $MF_D$ can be implemented by a source follower. However, this is not intended to limit the present disclosure.

It is worth noting that, except for being uncoupled from the photoelectric conversion unit 230, the reference node RN is connected to a circuit structure (or signal transmission path(s)) is similar/identical to that connected to the floating diffusion node FN. As a result, the reference signal RS at the reference node RN can carry a replica of noise interference with the electrical signal ES at the floating diffusion node FN in a same pixel. In other words, the reference output $PO_D$ can carry a replica of noise interference with the pixel output $PO_P$.

Next, the processing circuit 120, coupled to the pixels $P_{11}$-$P_{MN}$, can generate a sensor output Vout according to the pixel output $PO_P$ and the reference output $PO_D$. The processing circuit 120 can be directly or indirectly connected to the first amplifier transistor $MF_P$ and the second amplifier transistor $MF_D$, thereby receiving the pixel output $PO_P$ and the reference output $PO_D$ directly or indirectly. In some embodiments, the processing circuit 120 can generate the sensor output Vout according to a result of subtraction of the reference output $PO_D$ from the pixel output $PO_P$. As the reference output $PO_D$ includes the replica of noise interference with the pixel output $PO_P$, the sensor output Vout can have greatly reduced noise components.

Compared to existing active noise cancellation techniques, which subtract average noise of a row of dummy pixels from an output of an active pixel, the proposed image sensor circuit can refer to individual noise occurring in each active pixel to perform noise reduction since a photoelectric conversion result and noise reference generated in a same pixel can be processed using the proposed image sensor circuit. As a result, the proposed image sensor circuit can achieve good noise reduction performance without utilizing numerous dummy pixels, thus having a large ratio of the number of effective pixels to the number of total pixels.

The above is provided for illustrative purposes only, and is not meant to limit the present disclosure. For example, the processing circuit 120 shown in FIG. 1 is not limited to performing subtraction operation upon the pixel output $PO_P$ and the reference output $PO_D$ to generate the sensor output Vout. As long as the sensor output Vout can be generated using suitable signal processing operations, e.g. referring to the reference output $PO_D$ to determine noise components in the pixel output $PO_P$ and/or subtract noise components from the pixel output $PO_P$, or other types of signal processing operations, associated modifications and alternatives fall within the scope of the present disclosure.

In addition, the circuit structure and control mechanism of the photoelectric conversion unit 230, the first processing unit 240 and/or the second processing unit 250 can be implemented in various manners. In some embodiments, the photodiode PD in the photoelectric conversion unit 230 can be directly connected to the first processing unit 240 or the floating diffusion node FN. In other words, the transfer transistor MT may be optional. In some embodiments, the first reset transistor $MR_P$ and the second reset transistor $MR_D$ can be controlled by two reset signals, which are synchronous or almost synchronous, respectively. In some embodiments, at least one of the first processing unit 240 and the second processing unit 250 may further include one or more electronic dements, such as a transistor or a capacitor. For example, at least one of the first processing unit 240 and the second processing unit 250 can employ four-transistor (4T) complementary metal-oxide-semiconductor image sensor (CMOS image sensor or CIS) pixel architecture. As another example, at least one of the first processing unit 240 and the second processing unit 250 can employ three-transistor, five-transistor, six-transistor or seven-transistor pixel architecture. As long as the second processing unit 250 can simulate/replicate noise interference with the floating diffusion node FN with the use of the reference node RN which is uncoupled from the photoelectric conversion unit 230, associated modifications and alternatives fall within the scope of the present disclosure.

Figure 3:
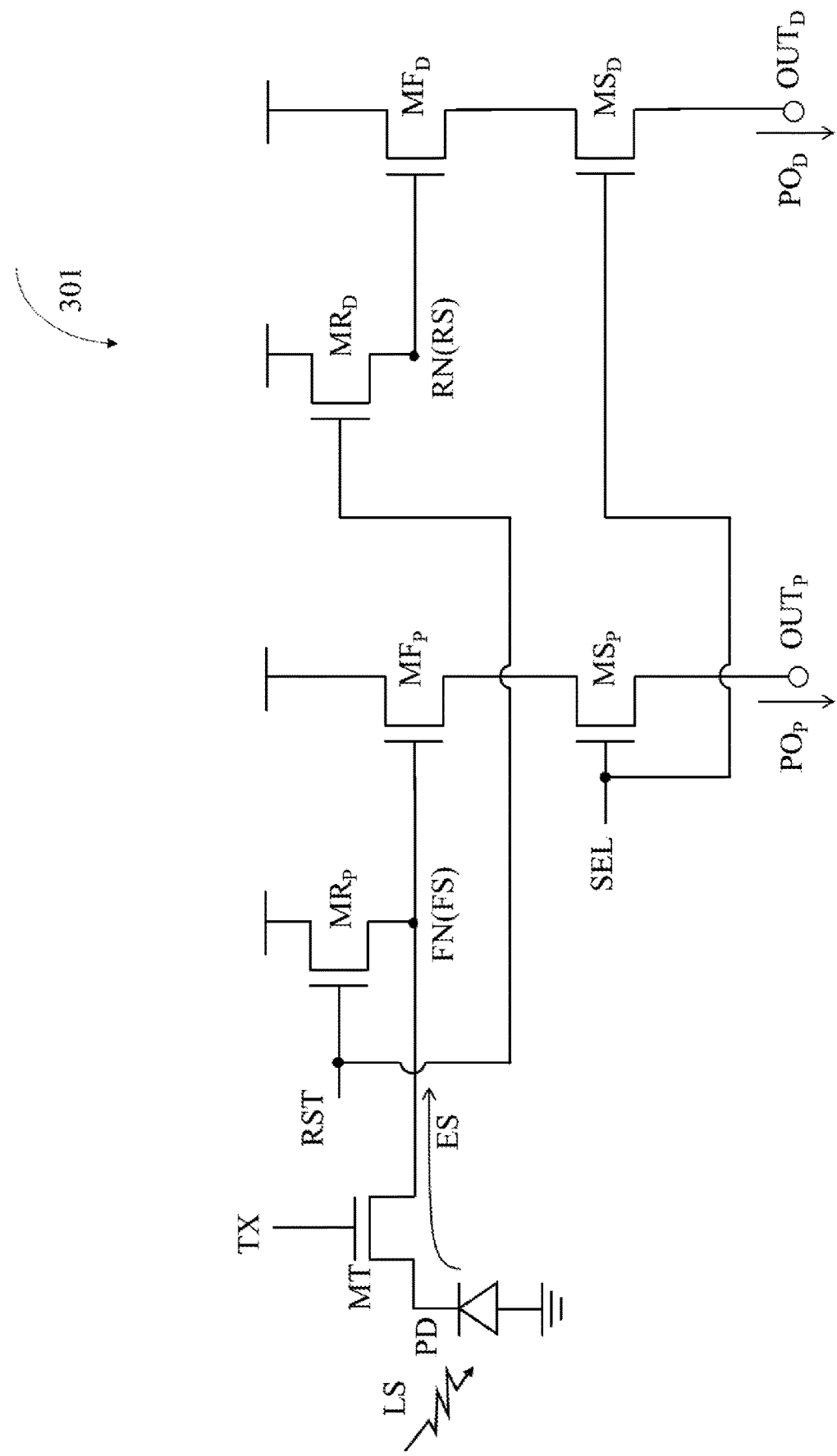
FIG. 3 illustrates an implementation of at least one of the pixels shown in FIG. 1 in accordance with some embodiments of the present disclosure.
Figure 4:
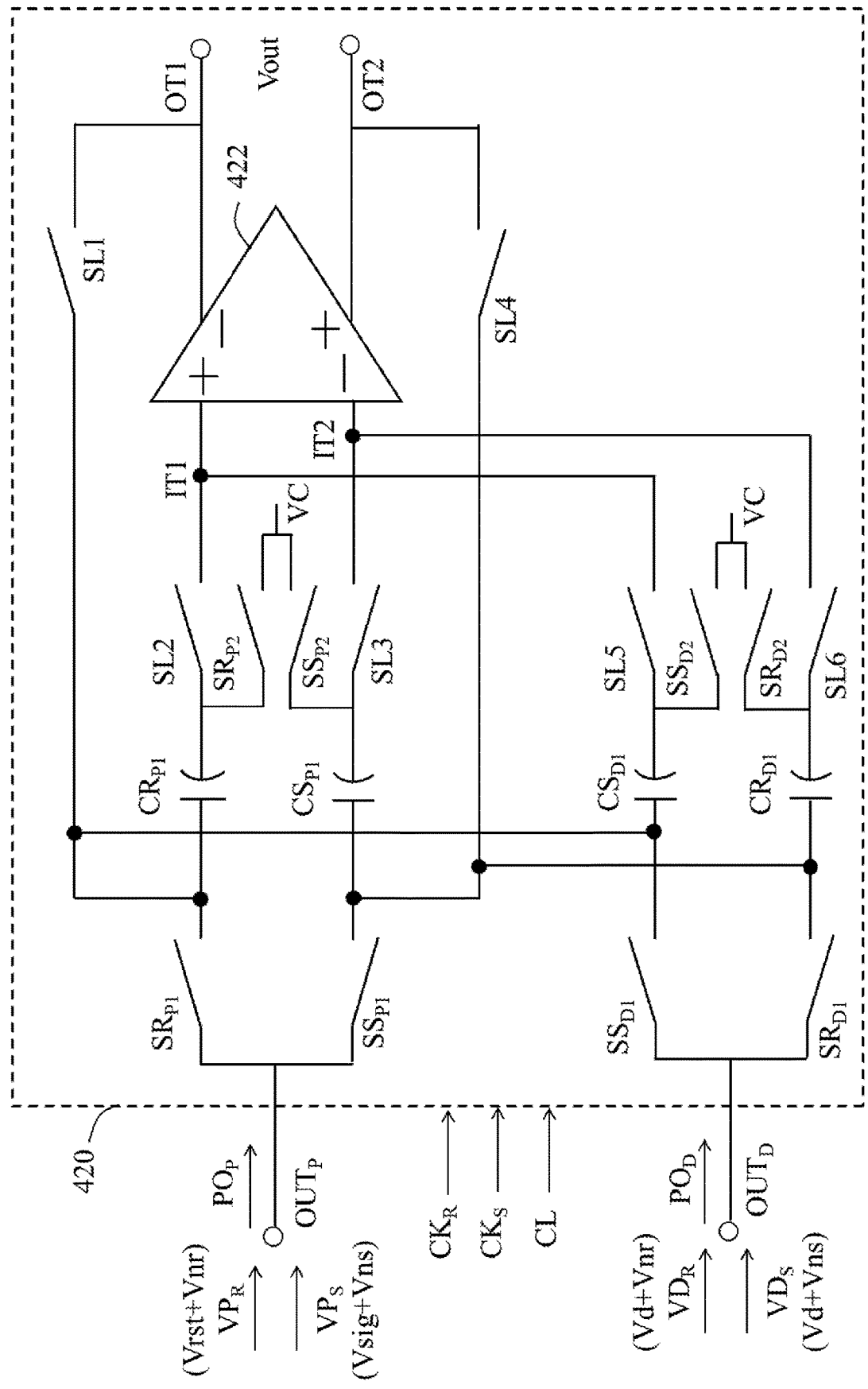
FIG. 4 illustrates at least a portion of the processing circuit shown in FIG. 1 in accordance with some embodiments of the present disclosure.

For illustrative purposes, the proposed image sensing scheme is described in more detail below with reference to some embodiments utilizing 4T CIS pixel architecture. For example, the image sensor circuit 100 shown in FIG. 1 can be used to implement a CMOS image sensor. However, this is not intended to limit the present disclosure. Referring to FIG. 3 and FIG. 4, an implementation of at least one of the pixels $P_{11}$-$P_{MN}$ shown in FIG. 1 is illustrated in FIG. 3 according to some embodiments of the present disclosure, and at least a portion of the processing circuit 120 shown in FIG. 1 is illustrated in FIG. 4 according to some embodiments of the present disclosure. The main difference between the structure of the pixel 301 and the structure of the pixel 201 shown in FIG. 2 is that the pixel 301 further includes a pixel signal output terminal $OUT_P$, a reference signal output terminal $OUT_D$, a first select transistor $MS_P$ and a second select transistor $MS_D$. The pixel signal output terminal $OUT_P$, coupled to the processing circuit 420, is configured to provide the pixel output $PO_P$ for the processing circuit 420. The reference signal output terminal $OUT_D$, coupled to the processing circuit 420, is configured to provide the reference output $PO_D$ for the processing circuit 420. The first select transistor $MS_P$, coupled between the first amplifier transistor $MF_P$ and the pixel signal output terminal $OUT_P$, is configured to selectively couple the pixel output $PO_P$ to the pixel signal output terminal $OUT_P$ according to a selection signal SEL. The selection signal SEL can be generated by the control circuit 110 shown in FIG. 1. The second select transistor $MS_D$ is coupled between the second amplifier transistor $MF_D$ and the reference signal output terminal $OUT_D$. The second select transistor $MS_D$ is configured to, when the first select transistor $MS_P$ couples the pixel output $PO_P$ to the pixel signal output terminal $OUT_P$, couple the reference output $PO_D$ to the reference signal output terminal $OUT_D$.

For example, the first select transistor $MS_P$ and the second select transistor $MS_D$ can be commonly controlled by the selection signal SEL. As a result, when the first select transistor $MS_P$ couples the pixel output $PO_P$ to the pixel signal output terminal $OUT_P$, the second select transistor $MS_D$ can couple the reference output $PO_D$ to the reference signal output terminal $OUT_D$ synchronously. However, this is not meant to be a limitation of the present disclosure. For example, in some embodiments, it is possible to utilize two selection signals, which are synchronous or almost synchronous, to control the first select transistor $MS_P$ and the second select transistor $MS_D$, respectively.

In the embodiment shown in FIG. 4, the processing circuit 420 may include, but is not limited to, a differential amplifier 422, a first reset capacitor $CR_{P1}$, a first signal capacitor $CS_{P1}$, a second reset capacitor $CR_{D1}$, a second signal capacitor $CS_{D1}$, and a plurality of switches $SR_{P1}$, $SR_{P2}$, $SR_{D1}$, $SR_{D2}$, $SS_{P1}$, $SS_{P2}$, $SS_{D1}$, $SS_{D2}$ and SL1-SL6. The differential amplifier 422 has a first amplifier input terminal IT1, a second amplifier input terminal IT2, a first amplifier output terminal OT1, a second amplifier output terminal OT2. The first amplifier output terminal OT1 and the second amplifier output terminal OT2 are configured to output the sensor output Vout. Each of the switches $SR_{P1}$, $SR_{P2}$, $SR_{D1}$ and $SR_{D2}$ is selectively turned on according to a first control signal $CK_R$. Each of the switches $SS_{P1}$, $SS_{P2}$, $SS_{D1}$ and $SS_{D2}$ is selectively turned on according to a second control signal $CK_S$. Each of the switches SL1-SL6 is selectively turned on according to a third control signal CL. Each of the first control signal $CK_R$, the second control signal $CK_S$ and the third control signal CL can be generated by the control circuit 110 shown in FIG. 1.

Figure 5:
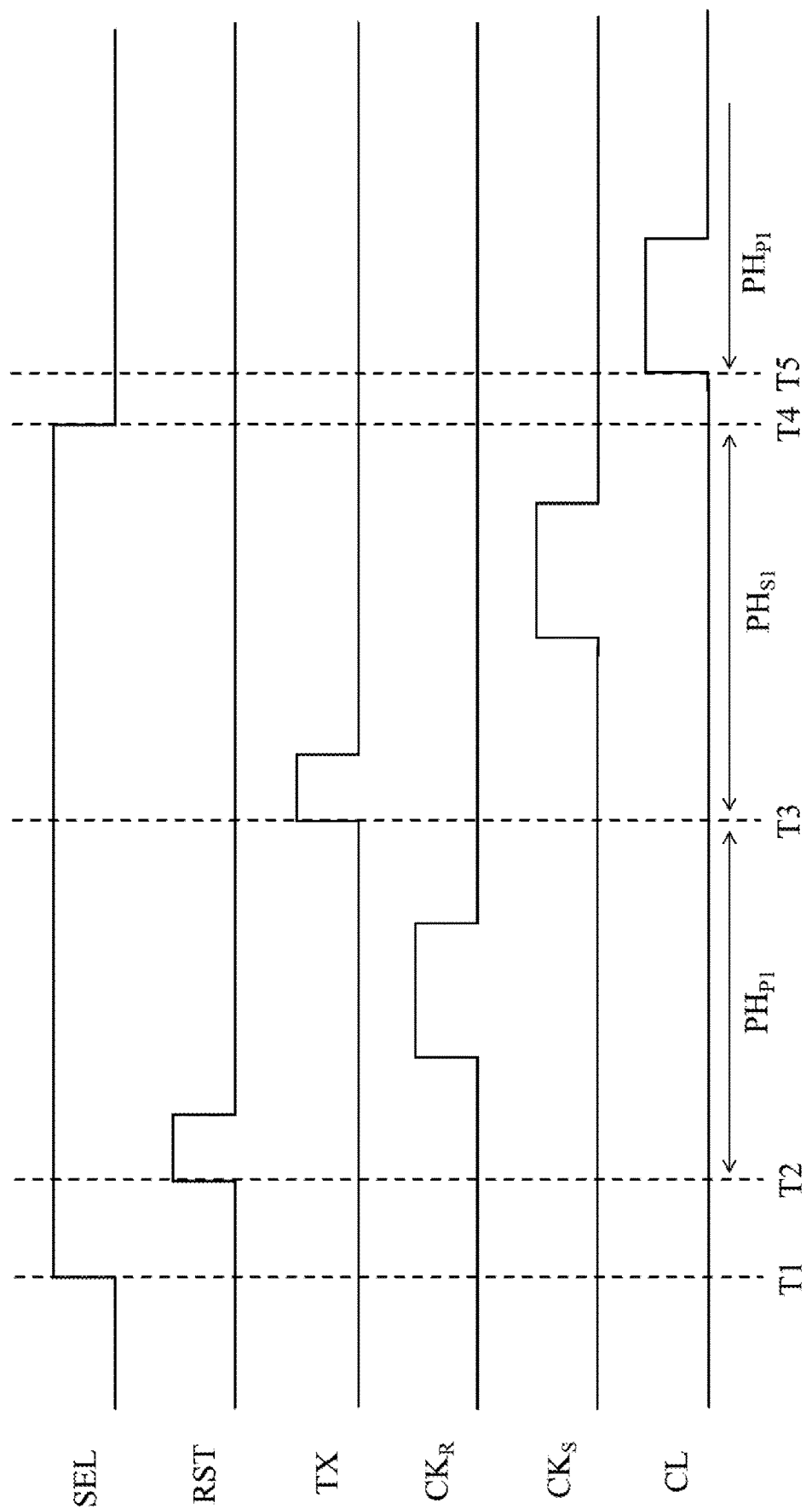
FIG. 5 is a timing diagram showing operations of the pixel shown in FIG. 3 and the processing circuit shown in FIG. 4 in accordance with some embodiments of the present disclosure.

FIG. 5 is a timing diagram showing operations of the pixel 301 shown in FIG. 3 and the processing circuit 420 shown in FIG. 4 in accordance with some embodiments of the present disclosure. Referring to FIG. 5 together with FIG. 3 and FIG. 4, the first select transistor $MS_P$ and the second select transistor $MS_D$ are turned on according to the selection signal SEL at time T1. Next, the image sensor circuit 100 shown in FIG. 1 can operate in a reset phase $PH_{R1}$, i.e. a period of time between time T2 and time T3. In the reset phase $PH_{R1}$, the first reset transistor $MR_P$ can reset the floating diffusion node FN, and the first amplifier transistor $MF_P$ can amplify the pixel signal FS to generate a pixel processing signal $VP_R$ which can serve as a first portion of the pixel output $PO_P$. Additionally, the second reset transistor $MR_D$ can reset the reference node RN, and the second amplifier transistor $MF_D$ can amplify the reference signal RS to generate a reference processing signal $VD_R$ which can serve as a first portion of the reference output $PO_D$. It is worth noting that the circuit structure (or signal transmission path(s)) connected to the floating diffusion node FN is similar/identical to that connected to the reference node RN, except that the floating diffusion node FN is coupled to the transfer transistor MT and the photodiode PD while the reference node RN is uncoupled from the transfer transistor MT and the photodiode PD. As a result, each of the pixel processing signal $VP_R$ and the reference processing signal $VD_R$ includes a first noise signal component Vnr, which can represent a noise component carried by the pixel processing signal $VP_R$ and the reference processing signal $VD_R$. In addition, the pixel processing signal $VP_R$ further includes a first pixel signal component Vst, which can represent a component of the pixel processing signal $VP_R$ not resulting from noise interference. The reference processing signal $VD_R$ further includes a reference signal component Vd, which can represent a component of the reference processing signal $VD_R$ not resulting from noise interference.

After the floating diffusion node FN and the reset node RN are reset, the switches $SR_{P1}$, $SP_{P2}$, $SR_{D1}$ and $SR_{D2}$ can be turned on according to the first control signal $CK_R$. As a result, the first reset capacitor $CR_{P1}$ can be coupled between the pixel signal output terminal $OUT_P$ and a reference voltage VC. Also, the second reset capacitor $CR_{D1}$ can be coupled between the reference signal output terminal $OUT_D$ and the reference voltage VC.

Next, the image sensor circuit 100 shown in FIG. 1 can operate in a sampling phase $PH_{S1}$, i.e. a period of time between time T3 and time T4. In the sampling phase $PH_{S1}$, the transfer transistor MT is turned on according to the transfer signal TX, and the floating diffusion node FN receives the electrical signal ES. The first amplifier transistor $MF_P$ can amplify the pixel signal FS to generate a pixel sampling signal $VP_S$ serving as a second portion of the pixel output $PO_P$. The second amplifier transistor $MF_D$ can amplify the reference signal RS to generate a reference sampling signal $VD_S$ serving as a second portion of the reference output $PO_D$. Similarly, each of the pixel sampling signal $VP_S$ and the reference sampling signal $VD_S$ includes a second noise signal component Vns, which can represent a noise component carried by the pixel sampling signal $VP_S$ and the reference sampling signal $VD_S$. In addition, the pixel sampling signal $VP_S$ further includes a second pixel signal component Vsig, which can represent a component of the pixel sampling signal $VP_S$ not resulting from noise interference. For example, the second pixel signal component Vsig can correspond to a photoelectric conversion result. It is worth noting that, as the reference node RN is uncoupled from the transfer transistor MT and the photodiode PD, a component of the reference sampling signal $VD_S$ not resulting from noise interference is identical, or substantially identical, to a component of the reference processing signal $VD_R$ not resulting from noise interference, i.e. the reference signal component Vd.

After the transfer of the electrical signal ES to the floating diffusion node FN stops, i.e. the transfer transistor MT is turned off according to the transfer signal TX, the switches $SS_{P1}$, $SS_{P2}$, $SS_{D1}$ and $SS_{D2}$ can be turned on according to the second control signal $CK_S$. As a result, the first signal capacitor $CS_{P1}$ can be coupled between the pixel output terminal OUT and the reference voltage VC. Also, the second signal capacitor $CS_{D1}$ can be coupled between the reference signal output terminal $OUT_D$ and the reference voltage VC.

After the first select transistor $MS_P$ and the second select transistor $MS_D$ are turned off according to the selection signal SEL (time T4), the processing circuit 420, or an image sensor circuit including the processing circuit 420 such as the image sensor circuit 100 shown in FIG. 1, can enter a processing phase $PH_{P1}$ (after time T5). In addition, the processing circuit 420 can generate the sensor output Vout according to a result of subtraction of the reference processing signal $VD_R$ from the pixel processing signal $VP_R$ and a result of subtraction of the reference sampling signal $VD_S$ from the pixel sampling signal $VP_S$. For example, at time T5, the switches SL1-SL6 can be turned on according to the third control signal CL. As a result, the first reset capacitor $CR_{P1}$ can be coupled between the first amplifier input terminal IT1 and the first amplifier output terminal OT1. The first signal capacitor $CS_{P1}$ can be coupled between the second amplifier input terminal IT2 and the second amplifier output terminal OT2. The second signal capacitor $CS_{D1}$ can be coupled between the first amplifier input terminal IT1 and the first amplifier output terminal OT1. The second reset capacitor $CR_{D1}$ can be coupled between the second amplifier input terminal IT2 and the second amplifier output terminal OT2. In some cases where respective capacitance values of the first reset capacitor $CR_{P1}$, the first signal capacitor $CS_{P1}$, the second signal capacitor $CS_{D1}$ and the second reset capacitor $CR_{D1}$ are equal, the sensor output Vout can be determined according to the following equation:

$$Vout=((Vrst+Vnr)-(Vsig+Vns)+(Vd+Vns)-(Vd+Vnr))/2=(Vrst-Vsig)/2,$$

wherein because charge sharing occurs at the amplifier output terminal OT1/OT2, the sensor output Vout is equal to half of a result of subtraction of the second pixel signal component Vsig from the first pixel signal component Vrst. It is worth noting that even if the respective capacitance values of the first reset capacitor $CR_{P1}$, the first signal capacitor $CS_{P1}$, the second signal capacitor $CS_{D1}$ and the second reset capacitor $CR_{D1}$ are not equal, the processing circuit 420 can perform subtraction operation upon the pixel processing signal $VP_R$ and the reference processing signal $VD_R$ to cancel or substantially cancel the first noise signal component Vnr, and perform subtraction operation upon the pixel sampling signal $VP_S$ and the reference sampling signal $VD_S$ to cancel or substantially cancel the second noise signal component Vns, thereby obtaining the sensor output Vout having reduced noise.

Figure 6:
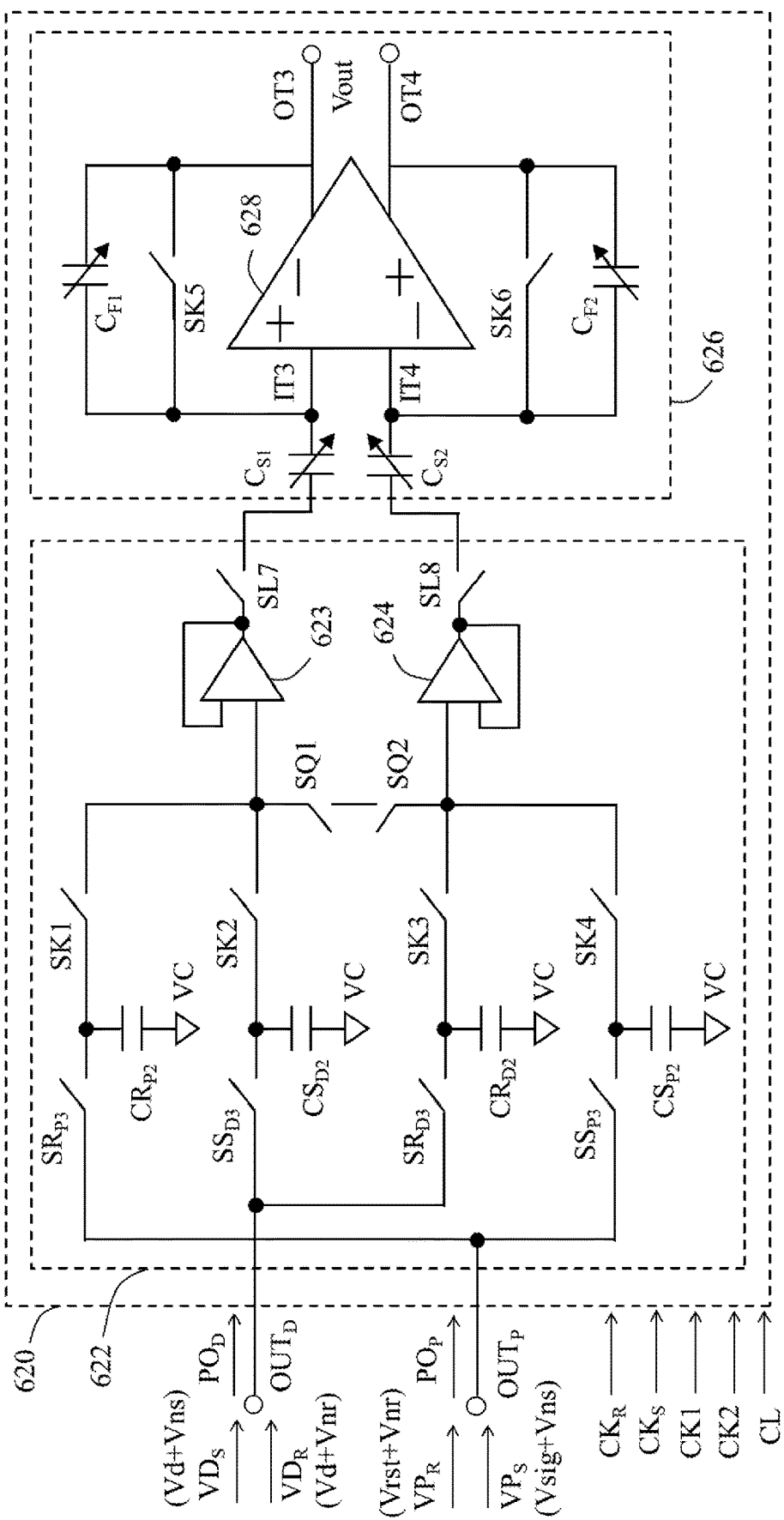
FIG. 6 illustrates at least a portion of the processing circuit shown in FIG. 1 in accordance with some embodiments of the present disclosure.

FIG. 6 illustrates at least a portion of the processing circuit 120 shown in FIG. 1 in accordance with some embodiments of the present disclosure. In the present embodiment, the processing circuit 620 includes, but is not limited to, a column correlated double sampling (CDS) and double delta sampling (DDS) circuit 622, and a programmable gain amplifier (PGA) and analog-to-digital converter (ADC) circuit 626. The column CDS and DDS circuit 622 includes a first reset capacitor $CR_{P2}$, a first signal capacitor $CS_{P2}$, a second reset capacitor $CR_{D2}$, a second signal capacitor $CS_{D2}$, a first buffer amplifier 623, a second buffer amplifier 624, and a plurality of switches $SR_{P3}$, $SR_{D3}$, $SS_{P3}$, $SS_{D3}$ SK1-SK4, SQ1, SQ2, SL7 and SL8. Each of the switches $SR_{P3}$ and $SR_{D3}$ is selectively turned on according to the first control signal $CK_R$. Each of the switches $SS_{P3}$ and $SS_{D3}$ is selectively turned on according to the second control signal $CK_S$. Each of the switches SL7 and SL8 is selectively turned on according to the third control signal CL. Each of the switches SK1-SK4 is selectively turned on according to a fourth control signal CK1. Each of the switches SQ1 and SQ2 is selectively turned on according to a fifth control signal CK2. The first control signal $CK_R$, the second control signal $CK_S$, the third control signal CL, the fourth control signal CK1 and the fifth control signal CK2 can be generated by the control circuit 110 shown in FIG. 1.

The PGA and ADC circuit 626 includes a differential amplifier 628, a plurality of switches SK5 and SK6, and a plurality of variable capacitors $C_{S1}$, $C_{S2}$, $C_{F1}$ and $C_{F2}$. The differential amplifier 628 has a first amplifier input terminal IT3, a second amplifier input terminal IT4, a first amplifier output terminal OT3 and a second amplifier output terminal OT4. The first amplifier output terminal OT3 and the second amplifier output terminal OT4 are configured to output the sensor output Vout. Each of the switches SK5 and SK6 is selectively turned on according to the fourth control signal CK1. The first variable capacitor $C_{S1}$ is coupled between the switch SL7 and the first amplifier input terminal IT3. The second variable capacitor $C_{S2}$ is coupled between the switch SL8 and the second amplifier input terminal IT4. The third variable capacitor $C_{F1}$ is coupled between the first amplifier input terminal IT3 and the first amplifier output terminal OT3. The fourth variable capacitor $C_{F2}$ is coupled between the second amplifier input terminal IT4 and the second amplifier output terminal OT4.

Figure 7:
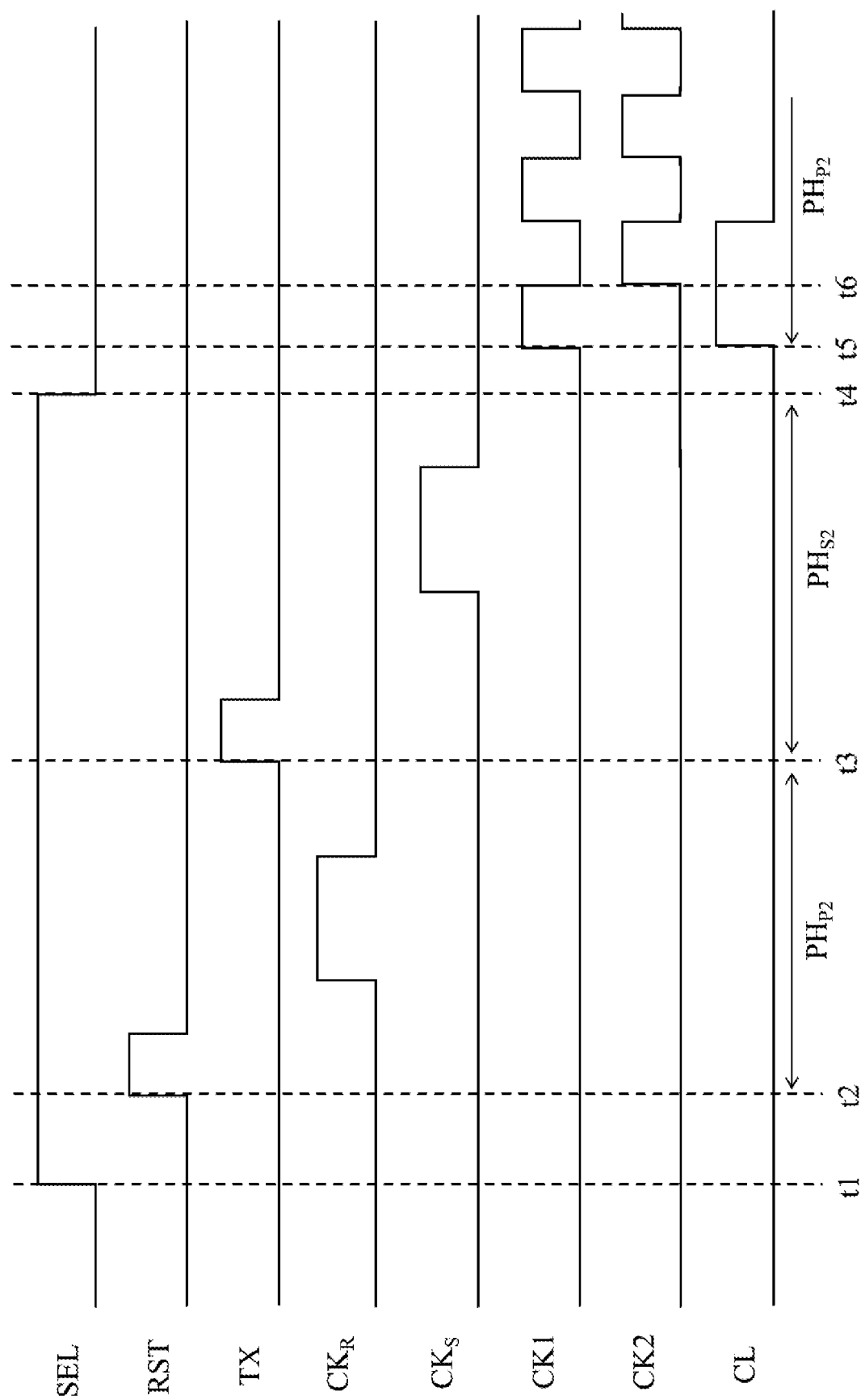
FIG. 7 is a timing diagram showing operations of the pixel shown in FIG. 3 and the processing circuit shown in FIG. 6 in accordance with some embodiments of the present disclosure.

FIG. 7 is a timing diagram showing operations of the pixel 301 shown in FIG. 3 and the processing circuit 620 shown in FIG. 6 in accordance with some embodiments of the present disclosure. Referring to FIG. 7 together with FIG. 3 and FIG. 6, the first select transistor $MS_P$ and the second select transistor $MS_D$ are turned on according to the selection signal SEL at time t1. Next, in a reset phase $PH_{R2}$, i.e. a period of time between time t2 and time t3, the operation of the pixel 301 is similar to that in the embodiment shown in FIG. 5. The first reset transistor $MR_P$ can reset the floating diffusion node FN, and the first amplifier transistor $MF_P$ can amplify the pixel signal FS to generate the pixel processing signal $VP_R$, serving as a portion of the pixel output $PO_P$. The pixel processing signal $VP_R$ includes the first pixel signal component Vst and the first noise signal component Vnr. The second reset transistor $MR_D$ can reset the reference node RN, and the second amplifier transistor $MF_D$ can amplify the reference signal RS to generate the reference processing signal $VD_R$, serving as a portion of the reference output $PO_D$. The reference processing signal $VD_R$ includes the reference signal component Vd and the first noise signal component Vnr. In addition, after the floating diffusion node FN and the reset node RN are reset, the switches $SR_{P3}$ and $SR_{D3}$ can be turned on according to the first control signal $CK_R$. As a result, the first reset capacitor $CR_{P2}$ can be coupled between the pixel signal output terminal $OUT_P$ and the reference voltage VC such as a ground voltage. Also, the second reset capacitor $CR_{D2}$ can be coupled between the reference signal output terminal $OUT_D$ and the reference voltage VC.

In a sampling phase $PH_{S2}$, i.e. a period of time between time t3 and time t4, the operation of the pixel 301 is similar to that in the embodiment shown in FIG. 5. The transfer transistor MT is turned on according to the transfer signal TX, and the floating diffusion node FN receives the electrical signal ES. The first amplifier transistor $MF_P$ can amplify the pixel signal FS to generate the pixel sampling signal $VP_S$, serving as another portion of the pixel output $PO_P$. The pixel sampling signal $VP_S$ includes the second pixel signal component Vsig and the second noise signal component Vns. The second amplifier transistor $MF_D$ can amplify the reference signal RS to generate the reference sampling signal $VD_S$, serving as another portion of the reference output $PO_D$. The reference sampling signal $VD_S$ includes the reference signal component Vd and the second noise signal component Vns. In addition, after the transfer transistor. MT is turned off according to the transfer signal TX, the switches $SS_{P3}$ and $SS_{D3}$ can be turned on according to the second control signal $CK_S$. As a result, the first signal capacitor $CS_{P2}$ can be coupled between the pixel signal output terminal $OUT_P$ and the reference voltage VC. Also, the second signal capacitor $CS_{D2}$ can be coupled between the reference signal output terminal $OUT_D$ and the reference voltage VC.

The processing circuit 620, or an image sensor circuit including the processing circuit 620 such as the image sensor circuit 100 shown in FIG. 1, can enter a processing phase $PH_{P2}$ (after time t5). In the processing phase $PH_{P2}$, the processing circuit 620 can generate the sensor output Vout according to a result of subtraction of the reference processing signal $VD_R$ from the pixel processing signal $VP_R$ and a result of subtraction of the reference sampling signal $VD_S$ from the pixel sampling signal $VP_S$. For example, at time t5, the switches SK1-SK6 can be turned on according to the fourth control signal CK1, and the switches SL7 and SLS can be turned on according to the third control signal CL. As a result, the pixel processing signal $VP_R$ and the reference sampling signal $VD_S$ can be outputted to the first variable capacitor $C_{S1}$ through the first buffer amplifier 623. The pixel sampling signal $VP_S$ and the reference processing signal $VD_R$ can be outputted to the second variable capacitor $C_{S2}$ through the second buffer amplifier 624. Also, respective signals at the first amplifier output terminal OT3 and the second amplifier output terminal OT4 can be reset.

At time t6, the switches SK1-SK6 are turned off according to the fourth control signal CK1, while the switches SQ1 and SQ2 are turned on according to the fifth control signal CK2 to reduce effects of process variations between columns. The sensor output Vout is generated accordingly. In some cases where respective capacitance values of the first reset capacitor $CR_{P2}$, the first signal capacitor $CS_{P2}$, the second reset capacitor $CR_{D2}$, the second signal capacitor $CS_{D2}$ are equal, respective capacitance values of the first variable capacitor $C_{S1}$ and the second variable capacitor $C_{S2}$ are $C_S$, and respective capacitance values of the third variable capacitor $C_{F1}$ and the fourth variable capacitor $C_{F2}$ are $C_F$, the sensor output Vout can be determined according to the following equation:

$$Vout=((Vrst+Vnr)-(Vsig+Vns)+(Vd+Vns)-(Vd+Vnr))$$
$$C_F/2C_S=(Vrst-Vsig)C_F/2C_S.$$

It is worth noting that even if the respective capacitance values of the first reset capacitor $CR_{P2}$, the first signal capacitor $CS_{P2}$, the second reset capacitor $CR_{D2}$ and the second signal capacitor $CS_{D2}$ are not equal, the respective capacitance values of the first variable capacitor $C_{S1}$ and the second variable capacitor $C_{S2}$ are not equal, and/or the respective capacitance values of the third variable capacitor $C_{F1}$ and the fourth variable capacitor $C_{F2}$ are not equal, the processing circuit 620 can perform subtraction operation upon the pixel processing signal $VP_R$ and the reference processing signal $VD_R$ to cancel or substantially cancel the first noise signal component Vnr, and perform subtraction operation upon the pixel sampling signal $VP_S$ and the reference sampling signal $VD_S$ to cancel or substantially cancel the second noise signal component Vns, thereby obtaining the sensor output Vout having reduced noise.

Figure 8:
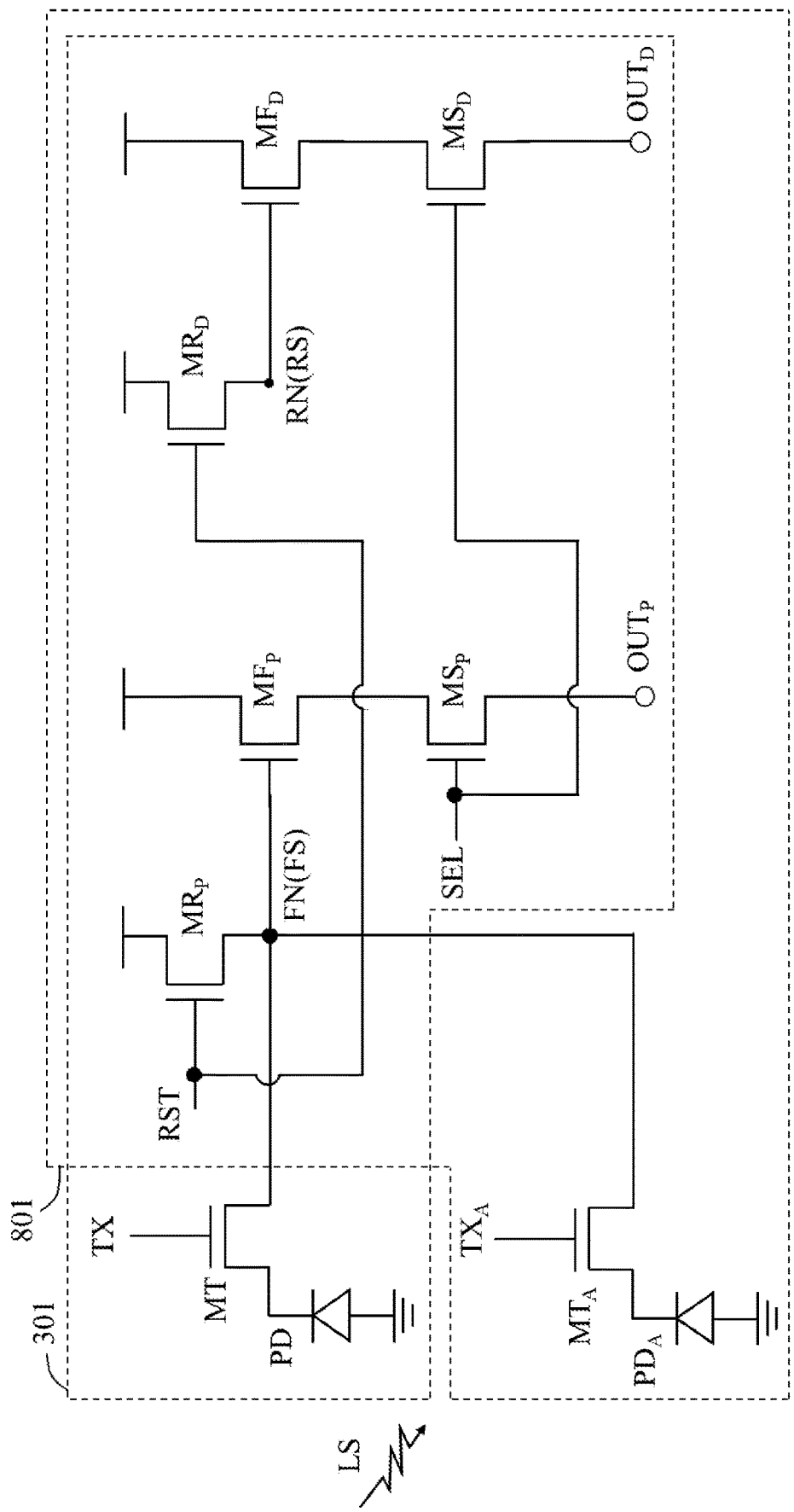
FIG. 8 illustrates an exemplary pixel adjacent to the pixel shown in FIG. 3 in accordance with some embodiments of the present disclosure.

In some embodiments, the proposed image sensing scheme can be employed in an image sensor circuit including shared pixel architecture. FIG. 8 illustrates an exemplary pixel adjacent to the pixel 301 shown in FIG. 3 in accordance with some embodiments of the present disclosure. In the present embodiment, the pixel 801, such as one of the pixels $P_{11}$-$P_{MN}$ shown in FIG. 1, is adjacent to the pixel 301. For example, the pixel 801 and the pixel 301 can be disposed in adjacent rows, e.g. adjacent rows within the pixel array 102 shown in FIG. 1. The pixel 801 and the pixel 301 can share the floating diffusion node FN, the reference node RN, the first reset transistor $MR_P$, the second reset transistor $MR_D$, the first amplifier transistor $MF_P$, the second amplifier transistor $MF_D$, the first select transistor $MS_P$, the second select transistor $MS_D$, the pixel signal output terminal $OUT_P$ and the reference signal output terminal $OUT_D$. The pixel 801 further includes a photoelectric conversion unit. In the present embodiment, the photoelectric conversion unit may include a photodiode $PD_A$ and a transfer transistor $MT_A$. The photoelectric conversion unit is configured to perform photoelectric conversion upon the light signal LS. The transfer transistor $MT_A$ can be selectively turned on according to a transfer signal $TX_A$, which can be provided by the control circuit 110 shown in FIG. 1. As the pixel 801 and the pixel 301 share six transistors, the equivalent number of transistors per pixel is four.

Figure 9:
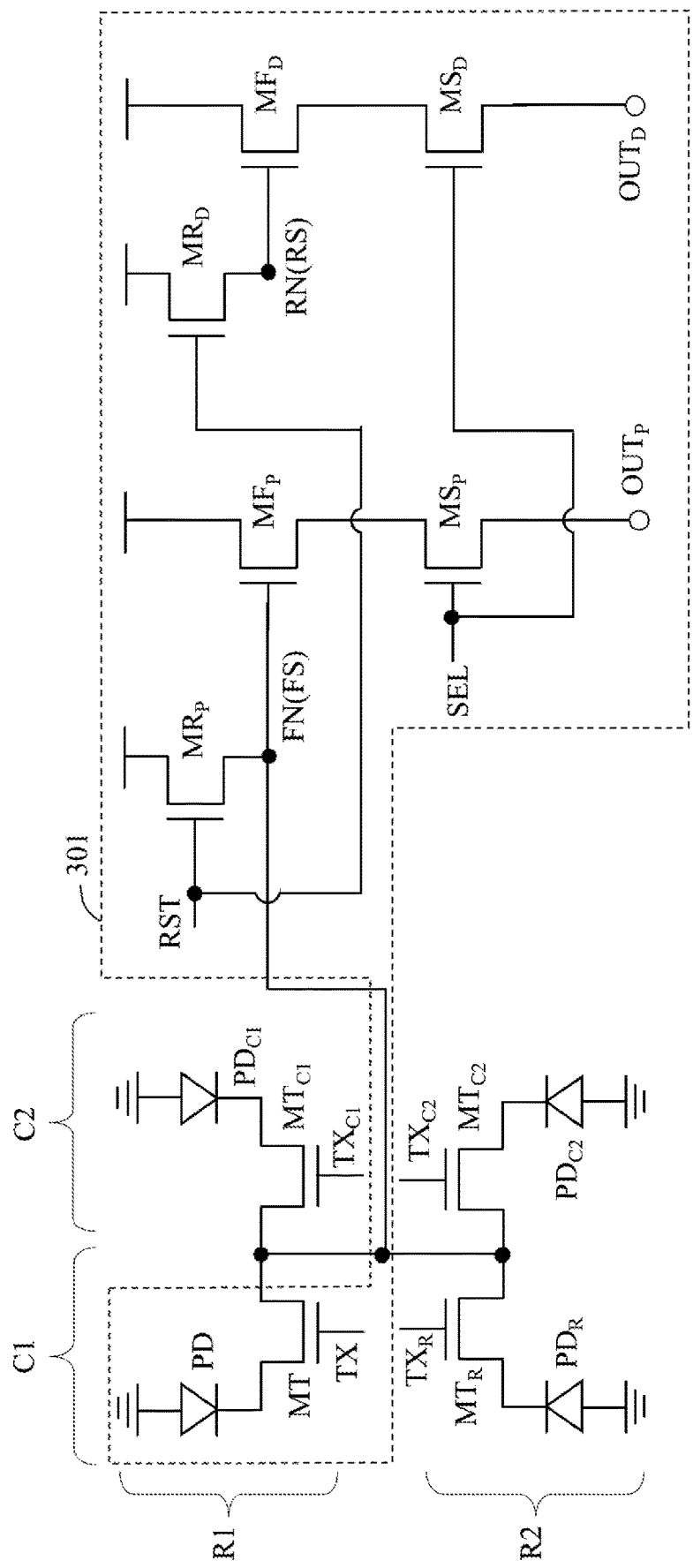
FIG. 9 illustrates a plurality of exemplary pixels adjacent to the pixel shown in FIG. 3 in accordance with some embodiments of the present disclosure.

FIG. 9 illustrates a plurality of exemplary pixels adjacent to the pixel 301 shown in FIG. 3 in accordance with some embodiments of the present disclosure. In the present embodiment, the pixel 301 is a pixel disposed in a row R1 and a column C1. A pixel, including a photoelectric conversion unit implemented by a photodiode $PD_R$ and a transfer transistor $MT_R$, is disposed in a row R2 adjacent to the row R1 and a column C1. A pixel, including a photoelectric conversion unit implemented by a photodiode $PD_{C1}$ and a transfer transistor $MT_{C1}$, is disposed in the row R1 and a column C2 adjacent to the column C1. A pixel, including a photoelectric conversion unit implemented by a photodiode $PD_{C2}$ and a transfer transistor $MT_{C2}$, is disposed in the row R2 and the column C2. The pixel 301 and each of the aforementioned three pixels can share the floating diffusion node FN, the reference node RN, the first reset transistor $MR_P$, the second reset transistor $MR_D$, the first amplifier transistor $MF_P$, the second amplifier transistor $MF_D$, the first select transistor $MS_P$, the second select transistor $MS_D$, the pixel signal output terminal $OUT_P$ and the reference signal output terminal $OUT_D$. In the present embodiment, the transfer transistors $MT_R$, $MT_{C1}$ and $MT_{C2}$ can be selectively turned on according to transfer signals $TX_R$, $TX_{C1}$ and $TX_{C2}$, respectively. The transfer signals $TX_R$, $TX_{C1}$ and $TX_{C2}$ can be generated by the control circuit 110 shown in FIG. 1. As the pixel 301 and each of the three adjacent pixels share six transistors, the equivalent number of transistors per pixel is 2.5.

In view of the above, the proposed image sensor circuit can not only have a large ratio of the number of effective pixels to the number of total pixels since numerous dummy pixels may not be needed, but also occupy a small chip/die area since shared pixel architecture can be employed therein. It is worth noting that the embodiments shown in FIG. 8 and FIG. 9 are provided for illustrative purposes only, and are not intended to limit the present disclosure. For example, the pixel 201 shown in FIG. 2 and an adjacent pixel can share circuit(s), such as at least one of the floating diffusion node FN, the reference node RN, the first reset transistor $MR_P$, the second reset transistor $MR_D$, the first amplifier transistor $MF_P$ and the second amplifier transistor $MF_D$. The adjacent pixel may utilize a photoelectric conversion unit included therein to transfer an electrical signal to the shared floating diffusion node FN, and accordingly generate a plurality of outputs, such as a pixel output carrying photoelectric conversion information and a reference output carrying noise interference information. The corresponding processing circuit, e.g. the processing circuit 120 shown in FIG. 1, may receive the outputs through shared signal output terminal(s), e.g. the pixel signal output terminal $OUT_P$ and the reference signal output terminal $OUT_D$ shown in FIG. 3, and accordingly output a sensor output corresponding to the adjacent pixel. In other words, in some embodiments, the pixel 201 and adjacent pixel(s) can share at least a portion of the first processing unit 240 and at least a portion of the second processing unit 250 such that the adjacent pixel(s) can generate corresponding pixel output(s) and reference output(s).

Figure 10:
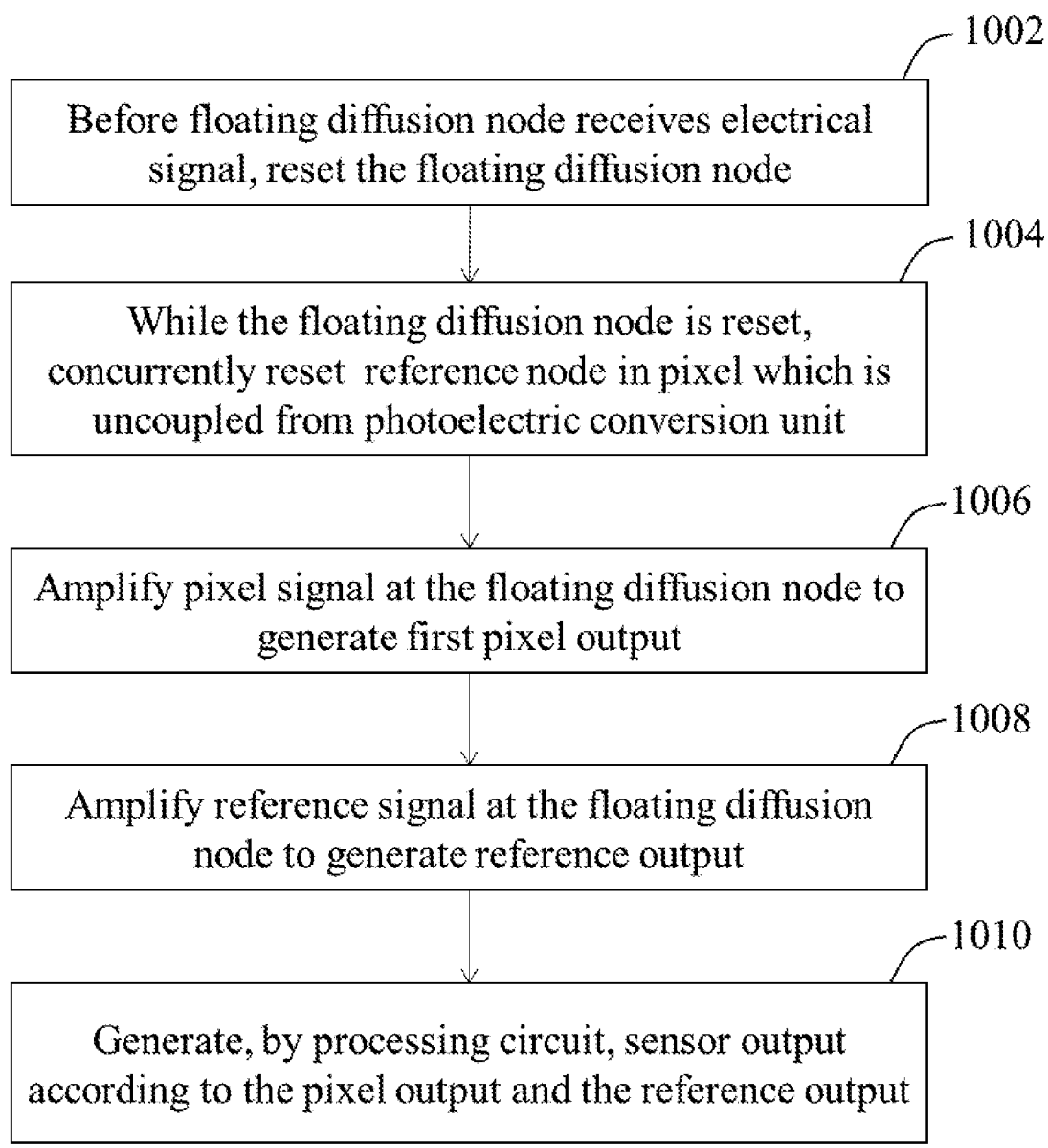
FIG. 10 is a flow chart of an exemplary control method of an image sensor circuit in accordance with some embodiments of the present disclosure.

The proposed image sensing scheme may be summarized in FIG. 10. FIG. 10 is a flow chart of an exemplary control method of an image sensor circuit in accordance with some embodiments of the present disclosure. Provided that the result is substantially the same, the steps are not required to be executed in the exact order shown in FIG. 10. For example, other steps or intermediate steps can be added. For illustrative purposes, the control method shown in FIG. 10 is described with reference to FIG. 3, FIG. 4 and FIG. 5. However, the control method shown in FIG. 10 can be employed in the image sensor circuit 100 shown in FIG. 1 and/or the pixel 201 shown in FIG. 2 without departing from the scope of the present disclosure. The control method shown in FIG. 10 may be summarized below.

Step 1002: Before a floating diffusion node receives an electrical signal, reset the floating diffusion node. For example, in the reset phase $PH_{R1}$ shown in FIG. 5, the floating diffusion node FN is reset according to the reset signal RST.

Step 1004: Reset a reference node in the pixel, uncoupled from a photoelectric conversion unit, while the floating diffusion node is concurrently reset. For example, in the reset phase $PH_{R1}$ shown in FIG. 5, the reference node RN is reset according to the reset signal RST.

Step 1006: Amplify a pixel signal at the floating diffusion node to generate a pixel output. For example, in the reset phase $PH_{R1}$ shown in FIG. 5, the pixel processing signal $VP_R$ serving as a portion of the pixel output $PO_P$ is generated. In the sampling phase $PH_{S1}$ shown in FIG. 5, the pixel sampling signal $VP_S$ serving as another portion of the pixel output $PO_P$ is generated.

Step 1008: Amplify a reference signal at the floating diffusion node to generate a reference output. For example, in the reset phase $PH_{R1}$ shown in FIG. 5, the reference processing signal $VD_R$ serving as a portion of the reference output $PO_D$ is generated. In the sampling phase $PH_{S1}$ shown in FIG. 5, the reference sampling signal $VD_S$ serving as another portion of the reference output $PO_D$ is generated.

Step 1010: Generate, by a processing circuit, a sensor output according to the pixel output and the reference output. For example, the processing circuit 420 shown in FIG. 4 is utilized to process the pixel processing signal $VP_R$, the pixel sampling signal $VP_S$, the reference processing signal $VD_R$ and the reference sampling signal $VD_S$ to generate the sensor output Vout.

In some embodiments, the generated pixel output and the generated reference output can be transmitted to the processing circuit concurrently or simultaneously. For example, with the use of the switches SL1-SL6 shown in FIG. 4, the pixel processing signal $VP_R$, the pixel sampling signal $VP_S$, the reference processing signal $VD_R$ and the reference sampling signal $VD_S$ can be transmitted to the processing circuit 420 concurrently or simultaneously. As one skilled in the art should understand the operation of each step shown in FIG. 10 after reading the above paragraphs directed to FIGS. 1-9, further description is omitted here for brevity.

While certain exemplary embodiments have been described and shown in the accompanying drawing, it is to be understood that such embodiments are merely illustrative of and not restrictive on the present disclosure. Those skilled in the art will readily observe that numerous modifications and alterations of the device and method may be made while retaining the teachings of the present disclosure. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An image sensor circuit, comprising:
   a pixel array, comprising a pixel, the pixel comprising:
      a photoelectric converter, configured to convert a light signal into an electrical signal;
      a first signal processing circuit, coupled to the photoelectric converter, the first signal processing circuit being configured to receive the electrical signal through a floating diffusion node included in the first signal processing circuit, and generate a pixel output; and
      a second signal processing circuit, configured to receive a reference signal through a reference node included in the second signal processing circuit, and generate a reference output, wherein the reference node is uncoupled from the photoelectric converter, and the reference output carries noise interference information; before the floating diffusion node receives the electrical signal, the first signal processing circuit and the second signal processing circuit located in the same pixel are configured to reset the floating diffusion node and the reference node, respectively and concurrently; and
   a pixel output processing circuit, coupled to the pixel, the pixel output processing circuit being configured to generate a sensor output according to the pixel output and the reference output.

2. The image sensor circuit of claim 1, wherein the noise interference information carried by the reference output is a replica of noise interference with the pixel output.

3. The image sensor circuit of claim 1, wherein the pixel output processing circuit is configured to generate the sensor output according to a result of subtraction of the reference output from the pixel output.

4. The image sensor circuit of claim 1, wherein the first signal processing circuit further comprises:
   a first reset transistor, coupled to the floating diffusion node, the first reset transistor being configured to, before the floating diffusion node receives the electrical signal, reset the floating diffusion node; and
   a first amplifier transistor, coupled to the floating diffusion node, the first amplifier transistor being configured to amplify a pixel signal at the floating diffusion node to generate the pixel output.

5. The image sensor circuit of claim 4, wherein the second signal processing circuit further comprises:
   a second reset transistor, coupled to the reference node, the second reset transistor being configured to, when the first reset transistor resets the floating diffusion node, reset the reference node; and
   a second amplifier transistor, coupled to the reference node, the second amplifier transistor being configured to amplify a reference signal at the reference node to generate the reference output.

6. The image sensor circuit of claim 5, wherein the first reset transistor and the second reset transistor are commonly controlled by a reset signal.

7. The image sensor circuit of claim 5, wherein the first signal processing circuit further comprises:
   a pixel signal output terminal, coupled to the pixel output processing circuit, the pixel signal output terminal being configured to provide the pixel output for the pixel output processing circuit; and
   a first select transistor, coupled between the first amplifier transistor and the pixel signal output terminal, the first select transistor being configured to selectively couple the pixel output to the pixel signal output terminal; and
the second signal processing circuit further comprises:
   a reference signal output terminal, coupled to the pixel output processing circuit, the reference signal output terminal being configured to provide the reference output for the pixel output processing circuit; and
   a second select transistor, coupled between the second amplifier transistor and the reference signal output terminal, the second select transistor being configured to, when the first select transistor couples the pixel output to the pixel signal output terminal, couple the reference output to the reference signal output terminal.

8. The image sensor circuit of claim 7, wherein the first select transistor and the second select transistor are commonly controlled by a selection signal.

9. The image sensor circuit of claim 5, wherein when the image sensor circuit operates in a reset phase, the first reset transistor resets the floating diffusion node, the first amplifier transistor amplifies the pixel signal to generate a pixel processing signal serving as a first portion of the pixel output, the second reset transistor resets the reference node, and the second amplifier transistor amplifies the reference signal to generate a reference processing signal serving as a first portion of the reference output;
   when the image sensor circuit operates in a sampling phase, the floating diffusion node receives the electrical signal, the first amplifier transistor amplifies the pixel signal to generate a pixel sampling signal serving as a second portion of the pixel output, the second amplifier transistor amplifies the reference signal to generate a reference sampling signal serving as a second portion of the reference output; and
   in a processing phase, the pixel output processing circuit generates the sensor output according to a result of subtraction of the reference processing signal from the pixel processing signal and a result of subtraction of the reference sampling signal from the pixel sampling signal.

10. The image sensor circuit of claim 9, wherein the pixel output processing circuit comprises:
   a differential amplifier, having a first amplifier input terminal, a second amplifier input terminal, a first amplifier output terminal and a second amplifier output terminal;
   a first reset capacitor, configured to be coupled between the pixel signal output terminal and a reference voltage in the reset phase, and configured to be coupled between the first amplifier input terminal and the first amplifier output terminal in the processing phase;

a first signal capacitor, configured to be coupled between the pixel signal output terminal and the reference voltage in the sampling phase, and configured to be coupled between the second amplifier input terminal and the second amplifier output terminal in the processing phase;

a second reset capacitor, configured to be coupled between the reference signal output terminal and the reference voltage in the reset phase, and configured to be coupled between the second amplifier input terminal and the second amplifier output terminal in the processing phase; and a second signal capacitor, configured to be coupled between the reference signal output terminal and the reference voltage in the sampling phase, and configured to be coupled between the first amplifier input terminal and the first amplifier output terminal in the processing phase.

11. The image sensor circuit of claim 5, further comprising:

at least another pixel adjacent to the pixel, wherein the at least another pixel and the pixel share at least one of the floating diffusion node, the reference node, the first reset transistor, the second reset transistor, the first amplifier transistor and the second amplifier transistor.

12. The image sensor circuit of claim 1, wherein the photoelectric converter comprises:

a photodiode, configured to sense the light signal to generate the electrical signal; and a transfer transistor, coupled between the photodiode and the floating diffusion node, the transfer transistor being configured to selectively transfer the electrical signal to the floating diffusion node.

13. An image sensor circuit, comprising:

a pixel array, having a plurality pixels arranged in rows and columns, the pixels comprising:

a first pixel, comprising:

a first photoelectric converter, configured to convert a light signal into a first electrical signal;

a first signal processing circuit, coupled to the first photoelectric converter, the first signal processing circuit being configured to receive the first electrical signal through a floating diffusion node included in the first signal processing circuit, and generate a first pixel output; and a second signal processing circuit, configured to receive a reference signal through a reference node included in the second signal processing circuit, and generate a first reference output, wherein the reference node is uncoupled from the first photoelectric converter, and the first reference output carries noise interference information, before the floating diffusion node receives the first electrical signal, the first signal processing circuit and the second signal processing circuit located in the first same pixel are configured to reset the floating diffusion node and the reference node, respectively and concurrently; and a second pixel, wherein the second pixel and the first pixel are disposed in adjacent rows or adjacent columns; the second pixel comprises a second photoelectric converter, configured to convert the light signal into a second electrical signal; the second pixel and the first pixel share at least a portion of the first signal processing circuit and at least a portion of the second signal processing circuit such that the second pixel is configured to generate a second pixel output and a second reference output; and a pixel output processing circuit, coupled to the pixels, the pixel output processing circuit being configured to generate a first sensor output according to the first pixel output and the first reference output, and generate a second sensor output according to the second pixel output and the second reference output.

14. The image sensor circuit of claim 13, wherein the first signal processing circuit further comprises:

a first reset transistor, coupled to the floating diffusion node, the first reset transistor being configured to, before the floating diffusion node receives the first electrical signal, reset the floating diffusion node; and a first amplifier transistor, coupled to the floating diffusion node, the first amplifier transistor being configured to amplify a pixel signal at the floating diffusion node to generate the first pixel output; and the second sign processing circuit further comprises:

a second reset transistor, coupled to the reference node, the second reset transistor being configured to, when the first reset transistor resets the floating diffusion node, reset the reference node; and a second amplifier transistor, coupled to the reference node, the second amplifier transistor being configured to amplify a reference signal at the reference node to generate the first reference output.

15. The image sensor circuit of claim 14, wherein the second pixel and the first pixel share the floating diffusion node, the reference node, the first reset transistor, the second reset transistor, the first amplifier transistor and the second amplifier transistor; the second pixel is configured to perform image sensing and generate the second pixel output and the second reference output.

16. The image sensor circuit of claim 15, wherein the first pixel further comprises:

a pixel signal output terminal, coupled to the pixel output processing circuit, wherein the first pixel and the second pixel share the pixel signal output terminal; the pixel signal output terminal is configured to provide the first pixel output and the second pixel output for the pixel output processing circuit; and a reference signal output terminal, coupled to the pixel output processing circuit, wherein the first pixel and the second pixel share the reference signal output terminal; the reference signal output terminal is configured to provide the first reference output and the second reference output for the pixel output processing circuit.

17. The image sensor circuit of claim 16, wherein the first pixel further comprises:

a first select transistor, coupled between the first amplifier transistor and the pixel signal output terminal, the first select transistor being configured to selectively couple the first pixel output to the pixel signal output terminal; and a second select transistor, coupled between the second amplifier transistor and the reference signal output terminal, the second select transistor being configured to, when the first select transistor couples the first pixel output to the pixel signal output terminal, couple the first reference output to the reference signal output terminal;

wherein the first pixel and the second pixel share the first select transistor and the second select transistor.

18. A control method of an image sensor circuit, comprising:

before a floating diffusion node receives an electrical signal, resetting the floating diffusion node and a reference node concurrently according to a same reset signal, wherein the reference node is uncoupled from the electrical signal;

amplifying a pixel signal at the floating diffusion node to generate a pixel output;

amplifying a reference signal at the reference node to generate a reference output; and generating, by a pixel output processing circuit, a sensor output according to the pixel output and the reference output.

19. The control method of claim 18, wherein the step of generating the sensor output according to the pixel output and the reference output comprises:

subtracting the reference output from the pixel output; and generating the sensor output according to a result of subtraction of the reference output from the pixel output.

20. The control method of claim 19, wherein the step of resetting the floating diffusion node and the step of resetting the reference node are performed when the image sensor circuit operates in a reset phase; the step of amplifying the pixel signal at the floating diffusion node to generate the pixel output comprises:

when the image sensor circuit operates in the reset phase, amplifying the pixel signal at the floating diffusion node to generate a pixel processing signal serving as a first portion of the pixel output; and when the image sensor circuit operates in a sampling phase, receiving the electrical signal at the floating diffusion node, and amplifying the pixel signal at the floating diffusion node to generate a pixel sampling signal serving as a second portion of the pixel output;

the step of amplifying the reference signal at the reference node to generate the reference output comprises:

when the image sensor circuit operates in the reset phase, amplifying the reference signal to generate a reference processing signal serving as a first portion of the reference output; and when the image sensor circuit operates in the sampling phase, amplifying the reference signal to generate a reference sampling signal serving as a second portion of the reference output; and the step of generating the sensor output according to the pixel output and the reference output comprises:

generating the sensor output according to a result of subtraction of the reference processing signal from the pixel processing signal and a result of subtraction of the reference sampling signal from the pixel sampling signal.

* * * * *